(12) United States Patent
Matsumoto

(10) Patent No.: US 8,144,229 B2
(45) Date of Patent: Mar. 27, 2012

(54) SOLID-STATE IMAGE PICKUP DEVICE

(75) Inventor: Shizunori Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 489 days.

(21) Appl. No.: 12/360,600

(22) Filed: Jan. 27, 2009

(65) Prior Publication Data

US 2009/0195679 A1    Aug. 6, 2009

(30) Foreign Application Priority Data

Feb. 6, 2008  (JP) ................................ 2008-026301
May 30, 2008  (JP) ................................ 2008-142337

(51) Int. Cl.
*H04N 5/335* (2006.01)

(52) U.S. Cl. ..................... 348/312; 348/222.1

(58) Field of Classification Search ............... 348/222.1, 348/294, 295, 312
See application file for complete search history.

(56) References Cited

U.S. PATENT DOCUMENTS

| 6,118,945 A | 9/2000 | Tanaka |
| 2005/0030419 A1 | 2/2005 | Kikuchi |
| 2006/0198624 A1* | 9/2006 | Ono et al. ..................... 396/133 |

FOREIGN PATENT DOCUMENTS

| JP | 62-26402 | 11/1987 |
| JP | 2001-043302 | 2/2001 |

OTHER PUBLICATIONS

European Search Report dated Jun. 25, 2009 in connection with EP 09 25 0204.

* cited by examiner

*Primary Examiner* — Darryl J Collins
(74) *Attorney, Agent, or Firm* — SNR Denton US LLP

(57) ABSTRACT

A solid-state image pickup device including a driver-control unit configured to control the operation timing of a pulse-driven actuator driver based on the read timing of the sensor of a solid-state image pickup element is provided.

12 Claims, 17 Drawing Sheets

SOLID-STATE IMAGE PICKUP DEVICE

CROSS REFERENCES TO RELATED APPLICATIONS

The present invention contains subject matter related to Japanese Patent Application JP 2008-026301 filed in the Japanese Patent Office on Feb. 6, 2008 and Japanese Patent Application JP 2008-142337 filed in the Japanese Patent Office on May 30, 2008, the entire contents of which are incorporated herein by reference.

BACKGROUND OF THE INVENTION

1. Field of the Invention

The present invention relates to a solid-state image pickup device, and particularly relates to a solid-state image pickup device used as a device provided to convert light into an electric signal and output an image signal, the solid-state image pickup device featuring the driver of an actuator which drives a lens fixed to the upper part of an imaging area of the solid-state image pickup device.

2. Description of the Related Art

FIG. 1 shows an exemplary configuration of an ordinary camera used in related art.

The camera used in related art includes a solid-state image pickup device (image sensor) 11, a lens 12, an actuator 13, a driver 14, and a control integrated circuit (IC) 15.

Usually, the solid-state image pickup device 11 is provided near the lens 12. Further, the actuator 13 provided to drive the lens 12 is provided near the solid-state image pickup device 11.

The solid-state image pickup device 11 is significantly sensitive to a noise. In the past, therefore, a noise emitted from a device or the like provided near the solid-state image pickup device 11 sneaked into the solid-state image pickup device 11. Consequently, image signals were deteriorated. Since noises emitted from the actuator 13 provided near the solid-state image pickup device 11 get into the solid-state image pickup device 11 as a matter of course, provisions for the noises emitted from the actuator 13 or the like provided near the solid-state image pickup device 11 should be made.

There are various types of actuators that can be used as the above-described actuator 13. For example, there are an actuator operating through pulse driving and an actuator operating through a direct current (DC) and/or a voltage. Hereinafter, the actuator 13 operating through the pulse driving will be referred to as a pulse-driven actuator 13.

Particularly, the pulse-driven actuator 13 performs an operation causing the instantaneous passage of a current. At the moment of the above-described operation, noises emitted from the power source, the ground (GND), and a signal line provided to transfer a pulse signal, and/or noises transmitted via various types of signal lines (the power source and the GND) sneak into the solid-state image pickup device 11 and deteriorate image signals.

Therefore, it is important that provisions be made for noises which may get into the solid-state image pickup device 11, the noises having been emitted from the pulse-driven actuator 13.

As the provisions made for the noises which may get into the solid-state image pickup device 11, there is a method of blocking paths through which the above-described noises may be transmitted. More specifically, there are provisions that prevent noises from getting into the solid-state image pickup device 11, as below. Namely, the solid-state image pickup device 11 may be separated from components including the actuator 13, the driver 14, and so forth that can be the noise source. Further, the power source may be separated from the GND. Still further, a capacitive component may be provided between the power source and the GND so that noises doe not sneak into the power source and/or the GND.

However, the above-described provisions made for blocking the paths through which the noises may be transmitted, that is, the provisions which allow for separating the components that can be the noise source from each other, providing the capacitive component, and so forth are not appropriate in the field where downsizing of a mobile-phone camera module or the like is demanded, since the components should be provided in wide space.

There are other provisions, such as those disclosed in Japanese Unexamined Patent Application Publication No. 2001-43302. According to the above-described provisions, driving the actuator 13 is stopped during the time period over which image signals are output so that the image deterioration is reduced. According to the above-described provisions, however, it becomes difficult to drive the actuator 13 while the image signals are output. In that case, the actuator 13 operates only in a blanking period. As a result, the operation speed of the actuator 13 is decreased so that the speed of focus control and/or zoom control performed through the lens 12 is decreased.

SUMMARY OF THE INVENTION

As described above, it is important that provisions be made for noises which may get into the solid-state image pickup device 11, the noises having been emitted from the pulse-driven actuator 13. At the present time, however, sufficient provisions for the above-described problems have not been made. Namely, even though there has been a demand for a technology which can reduce the image deterioration caused by driving an actuator, drive the actuator while image signals are output, and attain a downsized camera, the demand has not been satisfied.

Accordingly, the present invention has been achieved to reduce the image deterioration caused by driving an actuator, drive the actuator while image signals are output, and attain a downsized camera at the same time.

A solid-state image pickup device according to an embodiment of the present invention includes driver-control means for controlling operation timing of a pulse-driven actuator driver based on the read timing of a sensor of a solid-state image pickup element.

The driver-control means synchronizes the operation timing with the read timing, and sets a cycle of a pulse signal of the actuator driver to an integral multiple and/or an integral submultiple of the read cycle of the sensor.

The driver-control means adjusts the phase of the pulse signal of the actuator driver.

The driver-control means changes the phase of the pulse signal of the actuator driver so that sampling timing of a read circuit of the sensor does not overlap an edge of the pulse signal.

The driver-control means performs control so that a pulse signal of the actuator driver does not occur when the sampling timing of a read circuit of the sensor overlaps the edge of the pulse signal.

The actuator driver is provided inside the solid-state image pickup device.

The actuator driver dynamically changes the drive capacity.

The driver-control means performs feedback control inside the solid-state image pickup device, so as to generate a pulse signal of the actuator driver by using a signal read from the sensor.

In a solid-state image pickup device according to another embodiment of the present invention, the operation timing of a pulse-driven actuator driver is controlled based on the read timing of a sensor of a solid-state image pickup element.

Thus, the present invention provides a solid-state image pickup device that can reduce the image deterioration caused by driving an actuator, drive the actuator while image signals are output, and attain downsizing at the same time.

DESCRIPTION OF THE PREFERRED EMBODIMENTS

Hereinafter, embodiments of the present invention will be described with reference to the attached drawings.

First Embodiment

Figure 2:
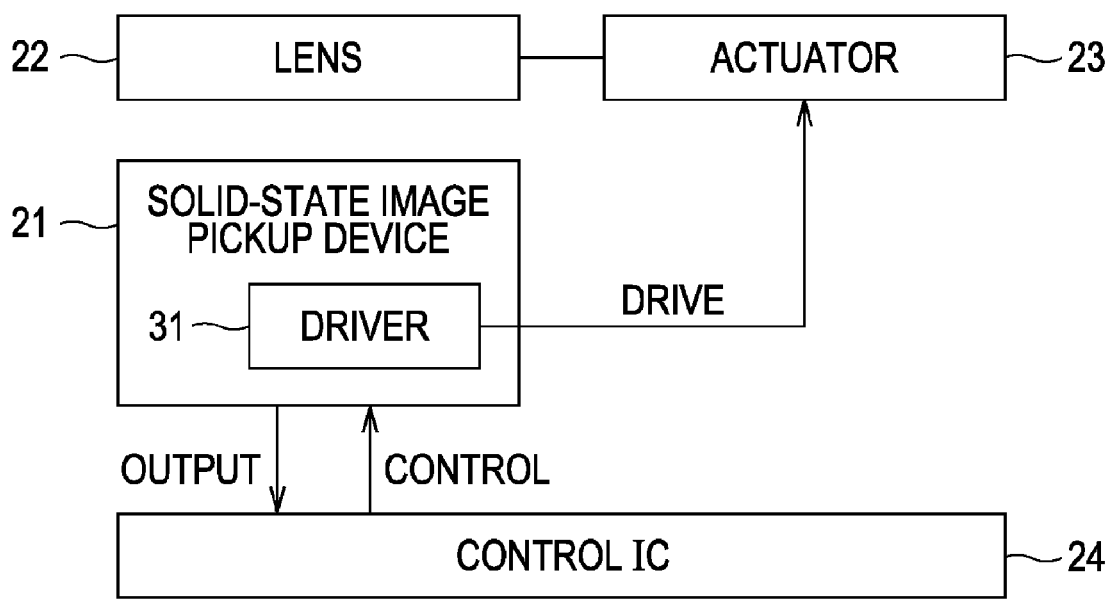
FIG. 2 shows an exemplary configuration of an apparatus according to an embodiment of the present invention.

FIG. 2 shows an exemplary configuration of an apparatus according to a first embodiment of the present invention.

The apparatus shown in FIG. 2 includes a solid-state image pickup device 21, a lens 22, an actuator 23, and a control integrated circuit (IC) 24. The lens 22 may be provided as a lens unit in place of a single lens. The actuator 23 is configured as a lens actuator.

A driver 31 of the actuator 23 is integrated into the solid-state image pickup device 21. Hereinafter, the driver 31 will be referred to as an actuator driver 31, or simply, the driver 31.

Figure 1:
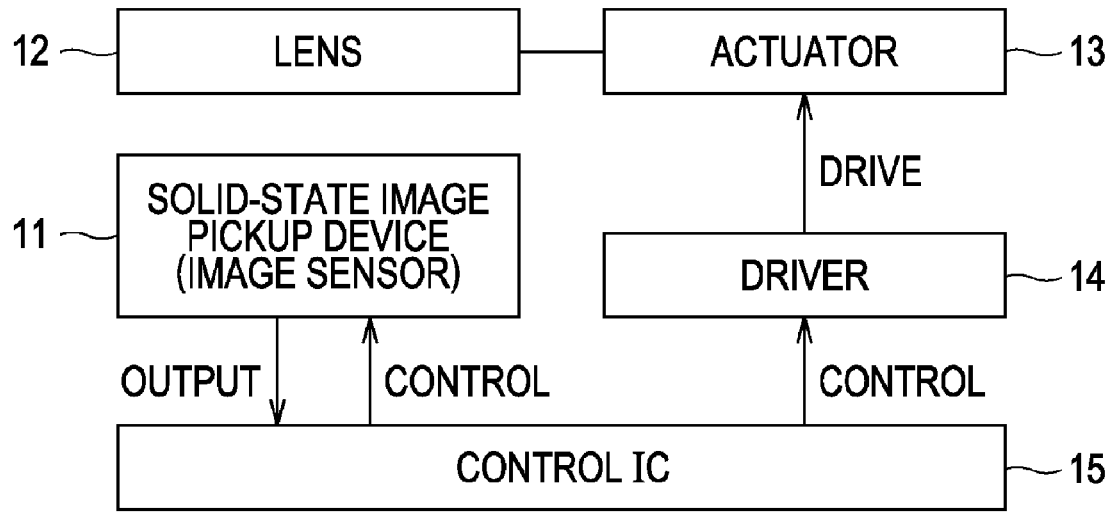
FIG. 1 shows an exemplary configuration of an ordinary camera used in related art.

When the apparatus shown in FIG. 2 is regarded as a camera module, the apparatus only includes the solid-state image pickup device 21, the lens 22, and the actuator 23, as its components. Therefore, it becomes possible to make the area of the driver component used for the actuator 23 smaller than that of a camera used in related art, the camera being shown in FIG. 1, so that the apparatus is downsized.

Further, when the apparatus shown in FIG. 2 is used for a segment in which the size reduction and provisions for an electro-magnetic interference (EMI) emitted from a signal line and/or a component should be provided, such as a camera module used for a mobile phone, integrating the driver 31 into the solid-state image pickup device 21 means that the length of signal wiring extending from the driver 31 provided inside the solid-state image pickup device 21 provided near the lens 22 to the actuator 23 can be decreased. That is to say, the integration of the driver 31 means that an EMI emitted from signal wiring subjected to pulse driving can be decreased.

However, when the driver 31 used for the actuator 23 is integrated into the solid-state image pickup device 21, the driver 31 may become the noise source for the solid-state image pickup device 21. Consequently, an image signal may be affected by a noise. The present invention is provided to solve the above-described problem. Hereinafter, the present invention will be described in sequence.

First, how the noise emitted from the driver 31 deteriorates an image signal transmitted from the solid-state image pickup device 21 will be described.

Figure 3:
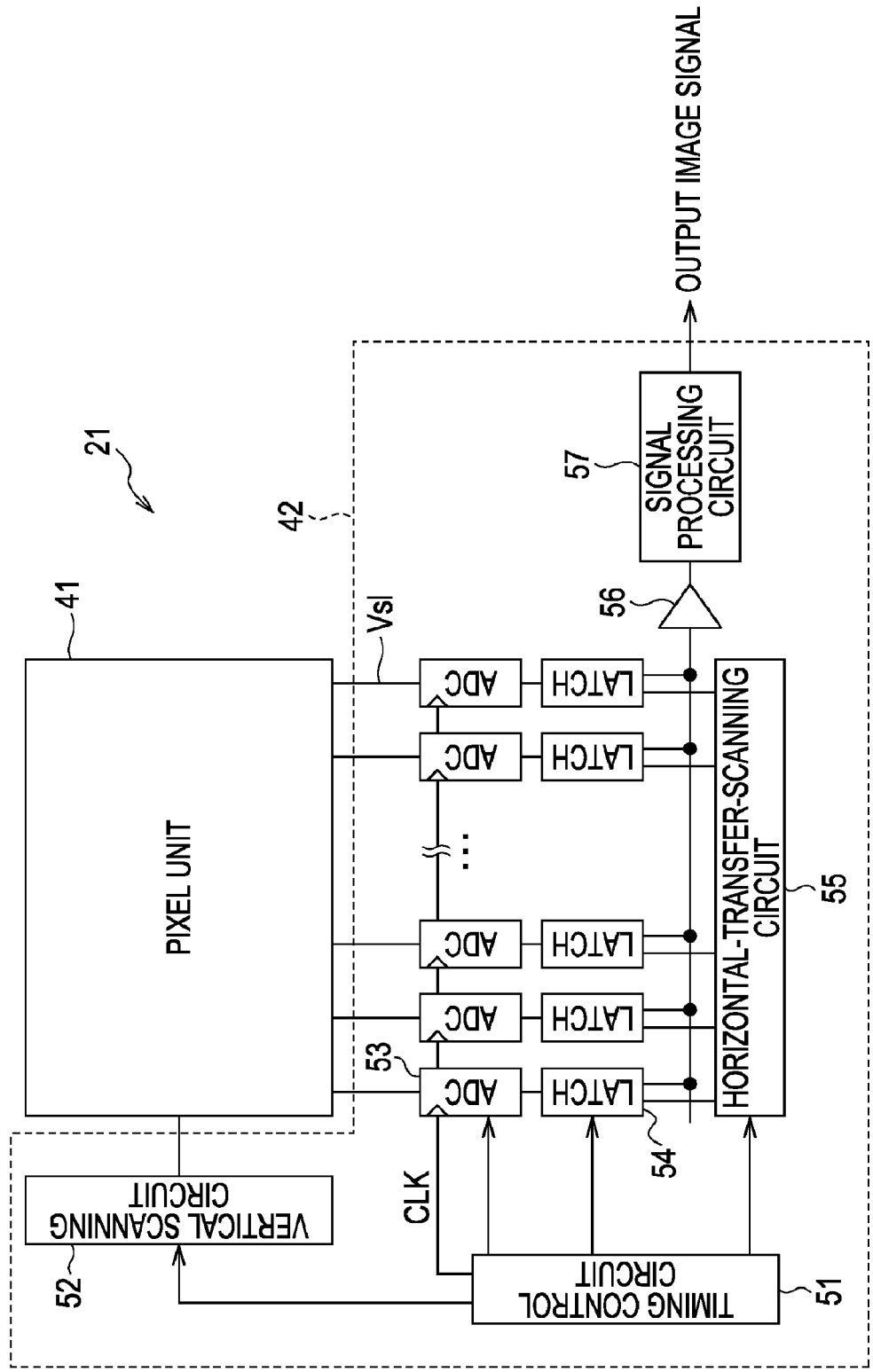
FIG. 3 shows an exemplary configuration of a MOS (CMOS) image sensor, which is one of solid-state image pickup devices.

FIG. 3 shows an exemplary configuration of the solid-state image pickup device 21 from which the driver 31 is omitted. The solid-state image pickup device 21 shown in FIG. 3 includes a metal-oxide-semiconductor (MOS) (complementary metal oxide semiconductor (CMOS)) image sensor used in related art in place of the driver 31.

The MOS image sensor can be manufactured through the same process as that performed for manufacturing the CMOS integrated circuit. In addition to an image-pickup-element block, a signal-processing block and a read-circuit block can be integrated into the MOS image sensor.

The solid-state image pickup device 21 includes a pixel unit 41 and the read circuit 42 thereof. According to FIG. 3, the read circuit 42 includes a timing-control circuit 51, a vertical-scanning circuit 52, a plurality of analog-to-digital converters (ADCs) 53, a plurality of latches 54, a horizontal-transfer-scanning circuit 55, an amplifier 56, and a signal-processing circuit 57.

Namely, the solid-state image pickup device 21 shown in FIG. 3 performs AD conversion for the analog signals corresponding to a single line of pixels at a time through the ADC 53, transfers digital data converted for each column in a horizontal direction through the horizontal-transfer-scanning circuit 55, and transmits the transferred digital data to an IC (not shown) provided in the post stage through the amplifier 56 and the signal-processing circuit 57.

Figure 4:
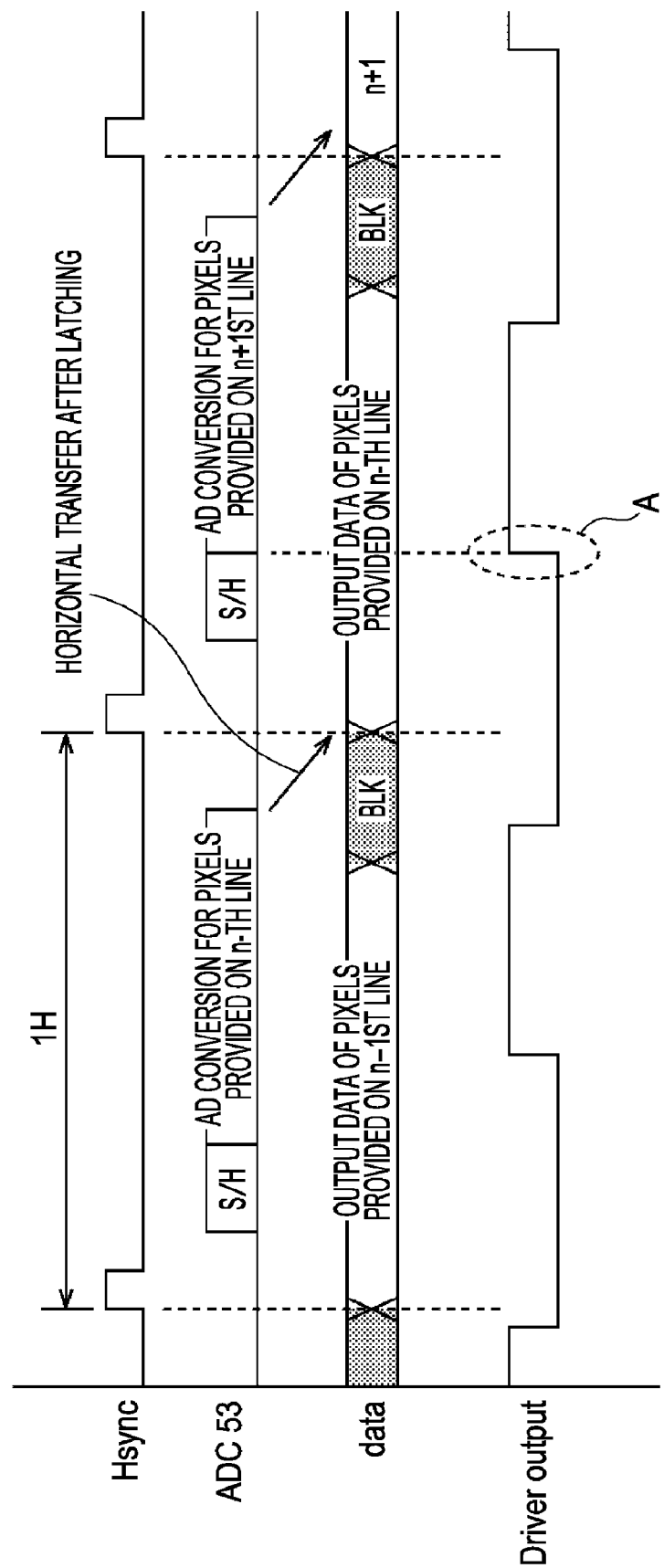
FIG. 4 shows timing charts showing exemplary operations performed by a solid-state image pickup element shown in FIG. 3.

FIG. 4 is a timing chart showing exemplary operations performed by the solid-state image pickup device 21 shown in FIG. 3.

The sign "Hsync" shown in FIG. 4 denotes a horizontal synchronizing signal. The cycle of the Hsync is determined to be a time period (1H) over which the image data corresponding to a single line is externally transmitted. The data corresponding to a single line is transmitted from the pixel unit 41 shown in FIG. 3 to the ADC 53 once the above-described time period 1H. The ADC 53 samples the signals (the pixel data corresponding to the single line) and performs AD conversion.

According to the timing chart of FIG. 4, an exemplary method of performing the sampling once, holding the signals (the pixel data corresponding to the single line), and performing the AD conversion is used. According to FIG. 4, a time period described as S/H is determined to be a time period over which the signals are held after the sampling is performed. Then, the time period following the time period S/H, which is described as AD conversion, is determined to be a time period over which AD conversion is performed for the held signals. However, depending on the AD-conversion methods, the sampling is often performed during the time period over which the AD conversion is performed. The AD-conversion method is not limited to the exemplary method shown in FIG. 4.

The sign "data" shown in FIG. 4 denotes data transmitted from the signal-processing circuit 57. The sign "Driver output" shown in FIG. 4 denotes a pulse driving the actuator 23, that is, a pulse transmitted from the driver 31 (hereinafter referred to as a driver pulse). Here, at the time indicated by the sign "A" shown in FIG. 4, noises occurring at the edge of the driver pulse sneak into the sensor of the pixel unit 41 and deteriorate image signals, where, at the time A, the time when the read circuit 42 samples data (the time period described as S/H) overlaps the edge of the driver pulse.

Figure 5:
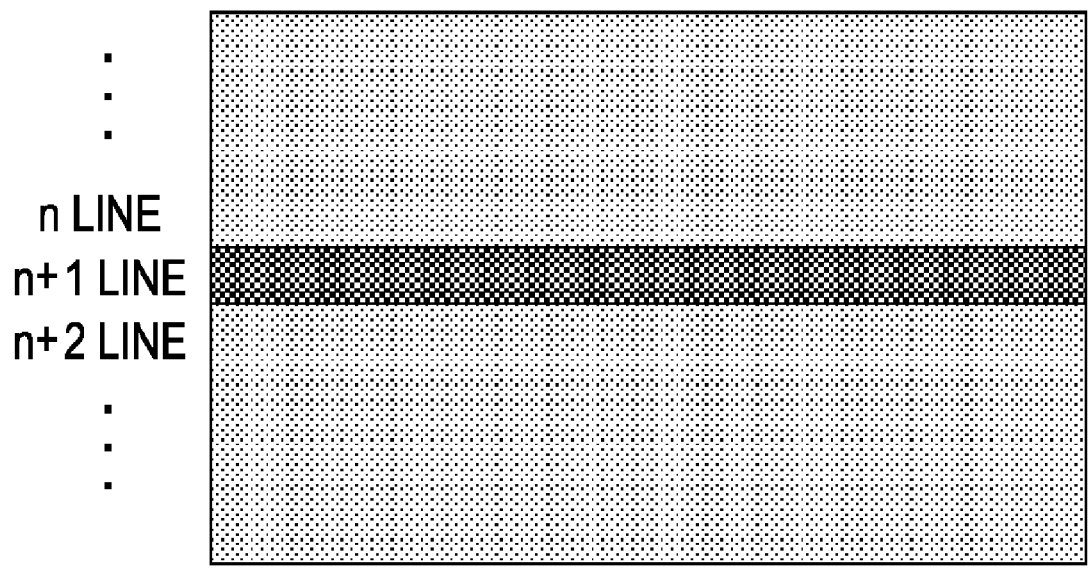
FIG. 5 conceptually shows a difference (noise) occurring only on a single line (n+1 line) where the pulse edge overlaps the time when the read circuit performs sampling when the screen is filled with a uniform video image.

In the case where the read circuit 21 shown in FIG. 3 is used, the ADC 53 provided for each column performs AD conversion for the image data corresponding to a single line at a time. Therefore, the noises caused by the driver pulse are mixed into the pixel data corresponding to the single line. As a result, when the screen is filled with an exemplary uniform video image, as shown in FIG. 5, the video image is deteriorated due to a difference (noise) occurring on a single line (only a n+1 line according to FIGS. 4 and 5) where the edge of the driver pulse overlaps the time when the read circuit 42 performs the sampling. Since the noise occurs when the edge of the driver pulse overlaps the time period over which the sampling is performed, the noise is shown on the video image at the time when the cycle of the driver pulse is aligned with that of the time period 1H (common multiple) so that transversal noises occur at intervals on the video image.

According to the above-described embodiment, the noises occur during the sampling periods shown in FIG. 4. However, the noises may occur in different places depending on the type of the ADC 53. Although the place in which the noise occurs is different, the noise occurs when the edge of the driver pulse comes to the "place in which the noise occurs", as is the case with the above-described embodiment.

Figure 6:
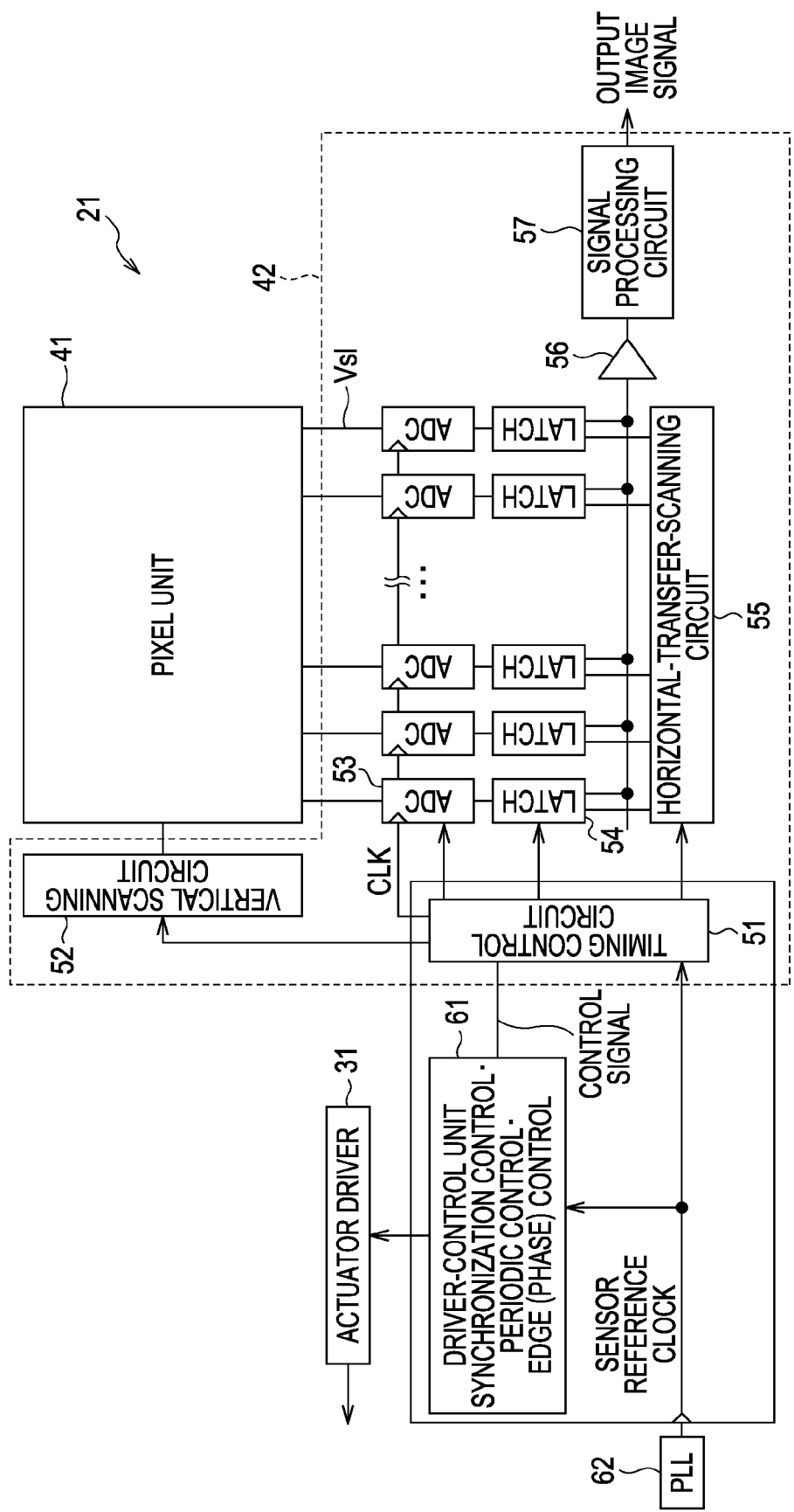
FIG. 6 specifically shows an exemplary circuit configuration of a solid-state image pickup device shown in FIG. 2.

The solid-state image pickup device 21 according to the above-described embodiment can be configured, as shown in FIG. 6, so as to solve the above-described image deterioration. Namely, FIG. 6 specifically shows an exemplary circuit configuration of the solid-state image pickup device 21 shown in FIG. 2. In FIG. 6, the same components as those shown in FIG. 3 are designated by the same reference numerals and the descriptions thereof are omitted as appropriate.

The solid-state image pickup device 21 shown in FIG. 6 includes the pixel unit 41 and the read circuit 42 thereof, the actuator driver 31 (hereinafter referred to as the driver 31 as appropriate), and a driver-control unit 61 (including a phase-locked loop (PLL) 62) controlling the actuator driver 31. In FIG. 6, the read circuit 42 includes the timing-control circuit 51, the vertical-scanning circuit 52, the ADCs 53, the latches 54, the horizontal-transfer-scanning circuit 55, the amplifier 56, and the signal-processing circuit 57. Therefore, the solid-state image pickup device 21 shown in FIG. 6 can perform control, so as to attain synchronization with the time when the sensor of the pixel unit 31 reads data.

Here, the driver 31 is provided in the solid-state image pickup device 21 according to the above-described embodiment, such as the solid-state image pickup device 21 shown in FIG. 6. Therefore, the solid-state image pickup device 21 according to the above-described embodiment can easily synchronize the time when the sensor provided in the pixel unit 31 is driven with the time when the driver 31 is driven. The above-described configuration of the solid-state image pickup device 21 is one of the features of the present invention.

Figure 7:
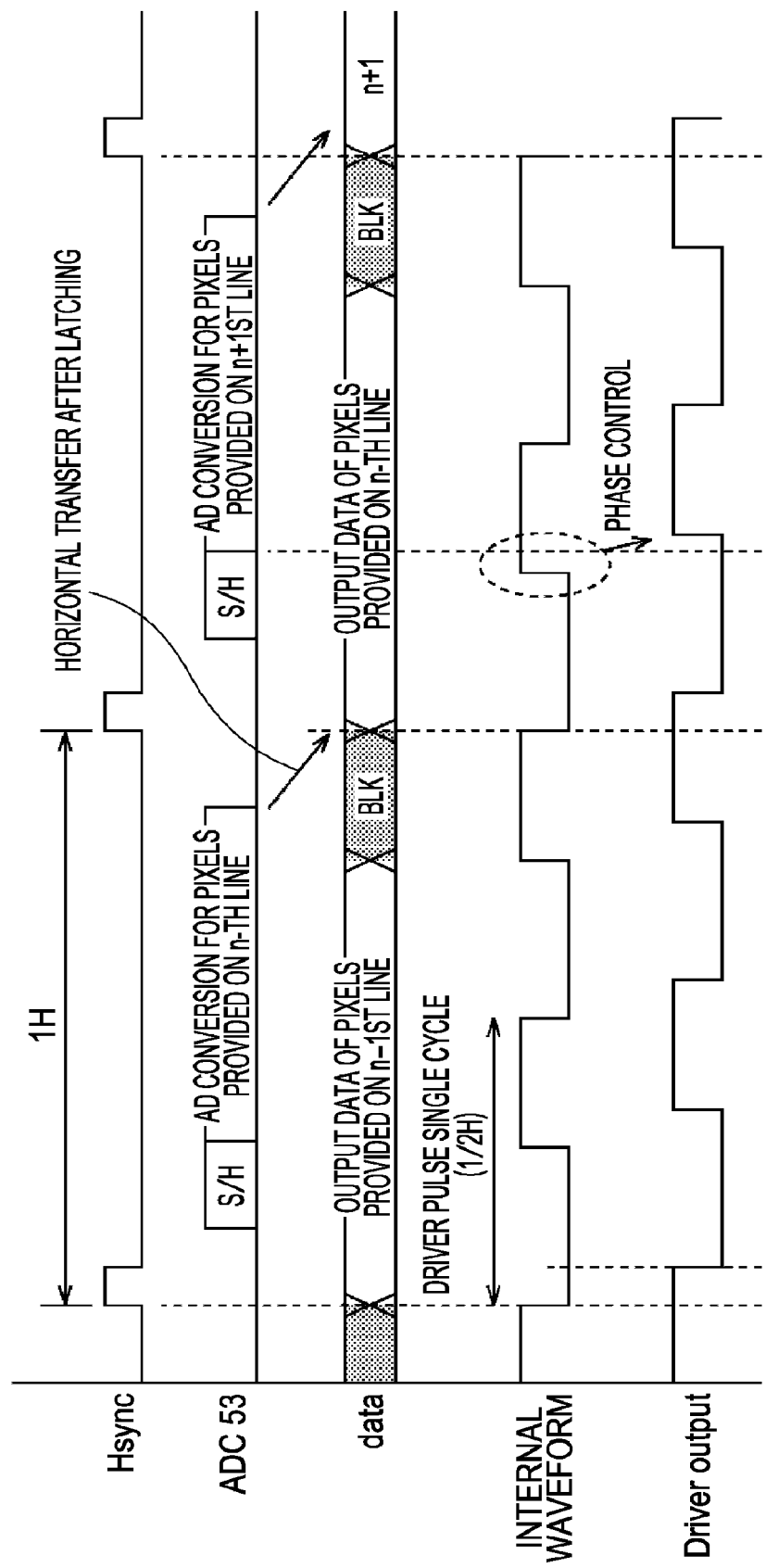
FIG. 7 shows timing charts indicating exemplary operations performed by a solid-state image pickup element shown in FIG. 6.

FIG. 7 shows timing charts indicating exemplary operations performed by the solid-state image pickup device 21 shown in FIG. 6. The timing charts "Hsync", "ADC 53", "data", and "Driver output" that are shown in FIG. 7 correspond to the timing charts shown in FIG. 4.

In FIG. 7, the driver-control unit 61 generates a pulse indicated as an internal waveform shown in FIG. 7, that is, a waveform pulse with the same cycle as that of a driver pulse driving the driver 31 in synchronization with the timing-control circuit 51 of the solid-state image pickup device 21.

It should be noted that the driver pulse is generated in synchronization with the read circuit 42, and the cycle of the driver pulse is set to an integral multiple of the time period 1H (1H, 2H, 3H, and so forth) and/or an integral submultiple of the time period 1H (1H, 1/2H, 1/3H, and so forth). In FIG. 7, the cycle of the driver pulse is set to 1/2H.

Accordingly, it becomes possible to synchronize the driver pulse with the time period 1H (an integral multiple of the time period 1H when the cycle of the driver pulse is longer than the time period 1H) so that the position of the edge of the driver pulse is fixed in the repetition cycle of the read circuit 42. Although the rise position changes in the case where pulse width modulation (PWM) control is performed, the cycle is synchronized with the sensor provided in the pixel unit 41.

The driver-control unit 61 performs the phase control so that the edge of the driver pulse does not fall within the sampling period (the time period S/H) and/or at the time when the noise sneaks into the read circuit 42 during the AD conversion based on the internal waveform synchronized with the timing of the sensor provided in the pixel unit 41 and that of the driver pulse. Consequently, the driver pulse (Driver output) shown in FIG. 7 can be generated.

Accordingly, the driver pulse is generated so that the edge thereof does not fall within the sampling period, which makes it possible to prevent any noise from sneaking into the read circuit 42 and read signals without causing the image deterioration.

Figure 8:
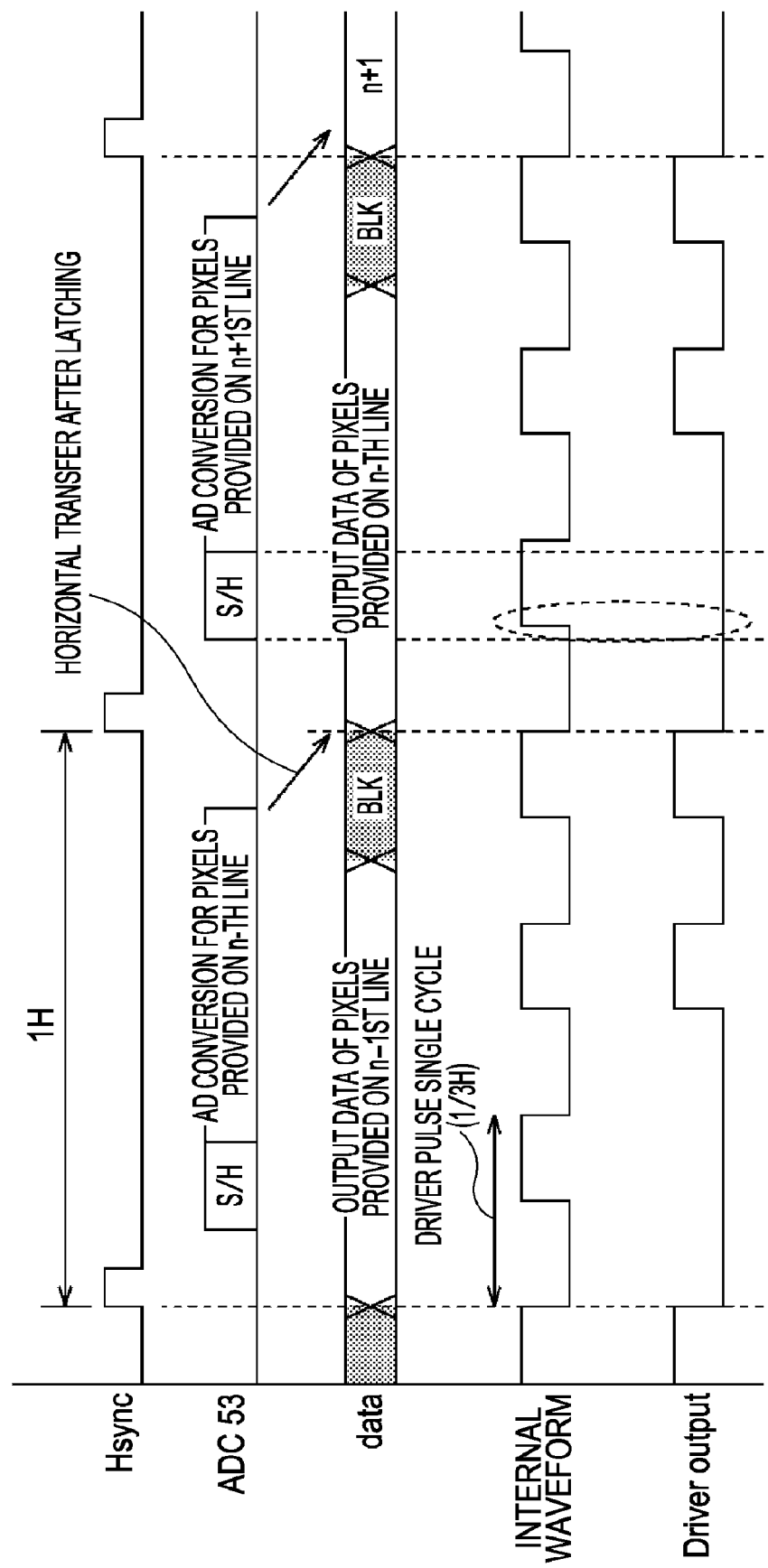
FIG. 8 shows timing charts indicating other exemplary operations performed by the solid-state image pickup element shown in FIG. 6.

The solid-state image pickup device 21 shown in FIG. 6 can perform different operations without being limited to the exemplary operations described in FIG. 7. For example, the solid-state image pickup device 21 can perform control in place of the phase adjustment, so as to prevent the occurrence of the pulse (to reduce the pulse) of a driver output obtained at the very moment when the edge of the driver pulse occurs at the time when the noise sneaks into the read circuit 42. The noise reduction can be performed through the above-described control. FIG. 8 shows exemplary timing charts illustrating the above-described control operations.

The control operations illustrated in FIG. 8 are equivalent to those shown in FIG. 7 in attaining synchronization with the cycle of the time period 1H. However, the control operations illustrated in FIG. 8 are performed, so as to attain the synchronization, and prevent the driver pulse (Driver output) from being caused at the time when the noise is sneaked into the read circuit 42, such as the sampling period.

That is to say, when performing control to maintain the cycle of the drier pulse and modulate the pulse width, such as the PWM control, the rise of the driver pulse is changed due to the modulation of the pulse width. Therefore, it is difficult to control the rising edge through the phase control. In that case, performing the control operations illustrated in FIG. 8 is suitable for attaining the above-described control. When the above-described control operations are performed, the driver pulses look like intermittent operations. However, when the driver pulses are regarded in a cycle of the time period 1H, the driver pulses become repetitive pulses so that the actuator 23 can be driven.

Thus, providing the driver 31 in the solid-state image pickup device 21 allows for attaining the synchronization and the phase control in the same block as that of the time when the sensor of the pixel unit 41 reads data, and generating driver pulses suitable for the read circuit 42 of the solid-state image pickup device 21. Consequently, it becomes possible to obtain image signals free from deterioration caused by noises.

Second Embodiment

Figure 9:
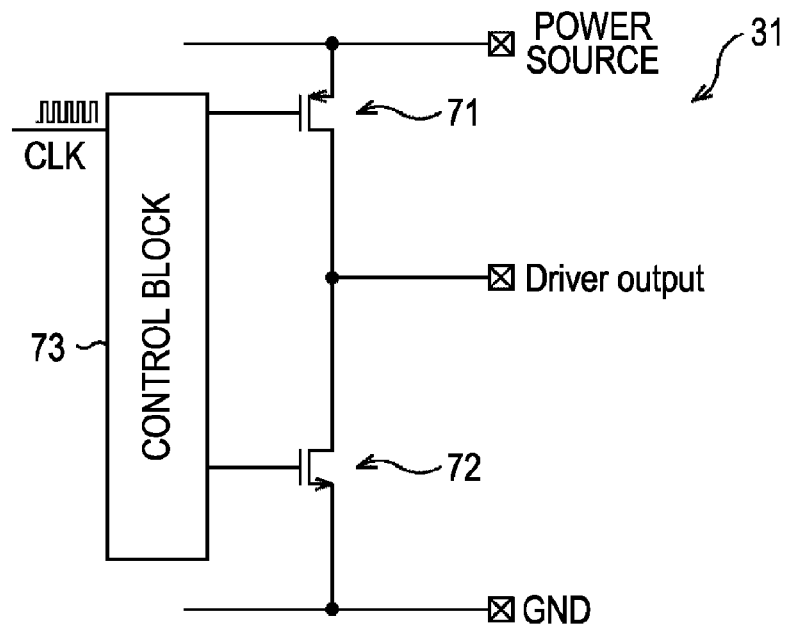
FIG. 9 shows an exemplary configuration of an actuator driver shown in FIG. 6.

The actuator driver 31 shown in FIG. 6 may have an exemplary full-swing output (inverter) configuration shown in FIG. 9. The actuator driver 31 shown in FIG. 9 includes a switching elements 71 and 72, and a control block 73. The control block 73 generates a driver pulse (Driver output) by controlling the switching state (ON state/OFF state) of each of the switching elements 71 and 72.

Figure 10:
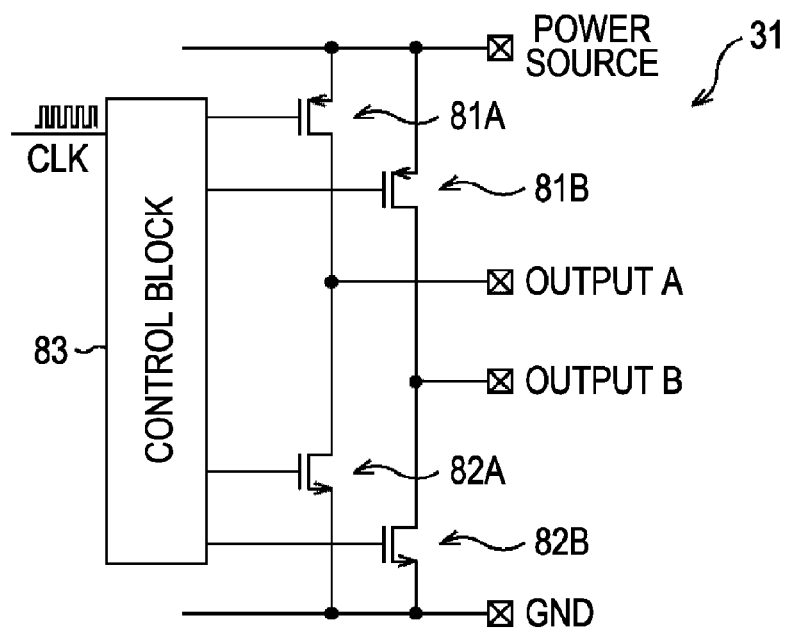
FIG. 10 shows another exemplary configuration of the actuator driver shown in FIG. 6.

Further, the actuator driver 31 shown in FIG. 6 may have an exemplary differential full-swing output configuration shown in FIG. 10, so as to increase the driving capability of the actuator 23. The actuator driver 31 shown in FIG. 10 includes switching elements 81A and 82A, switching elements 81B and 82B, and a control block 83. The control block 83 generates a pulse signal indicated by the sign "output A" shown in FIG. 11 by controlling the switching state (ON state/OFF state) of each of the switching elements 81A and 82A. Further, the control block 83 generates a pulse signal indicated by the sign "output B" shown in FIG. 11 by controlling the switching state (ON state/OFF state) of each of the switching elements 81B and 82B.

Figure 11:
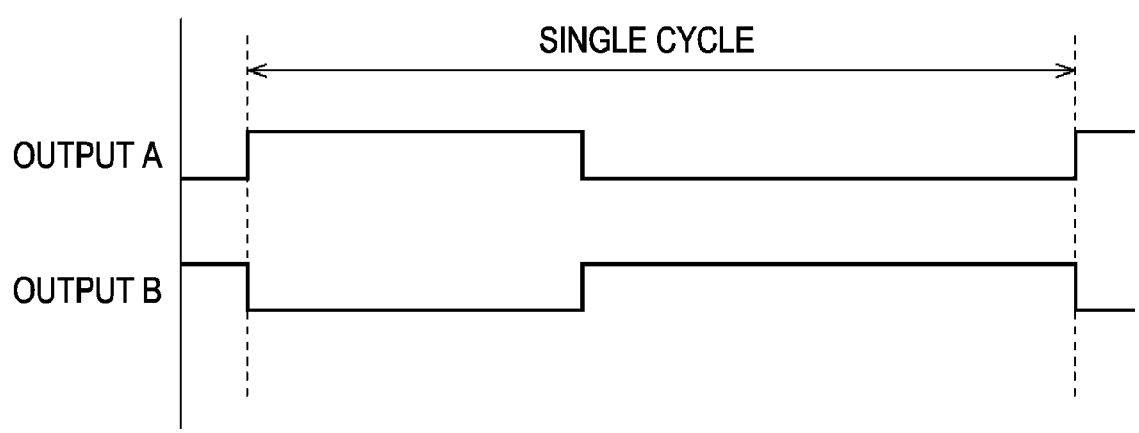
FIG. 11 shows timing charts indicating exemplary output operations performed by the actuator driver shown in FIG. 10.

That is to say, the pulse signals shown in FIG. 11 are transmitted from two output terminals A and B that are shown in FIG. 10, for example, and the actuator 23 is driven by the above-described pulse signals. Usually, the output terminals A and B are inverted so that an amplitude two times larger than that of each of the output terminals A and B is obtained in terms of differential.

Hereinafter, an example where a driver provided with two output terminals, such as the driver having the differential full-swing output configuration shown in FIG. 10, is adopted as the actuator driver 31 will be described. Without being limited to the above-described configuration in which the two output terminals are provided, the actuator driver 31 may have a single output terminal as shown in FIG. 9, for example.

A driver pulse transmitted from the driver 31 shown in FIG. 10 is transmitted to the actuator 23 so that the lens 22 or the like is driven, and an instantaneous current used to drive the load of the actuator 23 occurs at the edge of the driver pulse. The instantaneous current becomes the source of noises. The noises sneak into the solid-state image pickup device 21 and deteriorate image signals, as described above.

According to the above-described first embodiment (including the driver 31 shown in FIG. 10), the actuator driver 31 is provided in the solid-state image pickup device 21 so that the apparatus is downsized. Further, since the driver-output-signal line can be shortened, it becomes possible to reduce the EMI. Further, the problem caused by the noise source included in the solid-state image pickup device 21 is solved through the following configuration. Namely, the actuator driver 31 is provided in the solid-state image pickup device 21, which allows for attaining synchronization opposite to the time when the sensor of the pixel unit 41 is driven and the phase control. Consequently, it becomes possible to control the time when the noise occurs and reduce the image deterioration.

The second embodiment is equivalent to the first embodiment in attaining two advantages. Namely, the second embodiment allows for downsizing the apparatus by providing the actuator driver 31 in the solid-state image pickup device 21. Since the apparatus is downsized, the length of the driver-output-signal line can be minimized, which decreases the EMI. On the other hand, the second embodiment is different from the first embodiment in that the level of the noise source itself included in the solid-state image pickup device 21 is suppressed.

Figure 13:
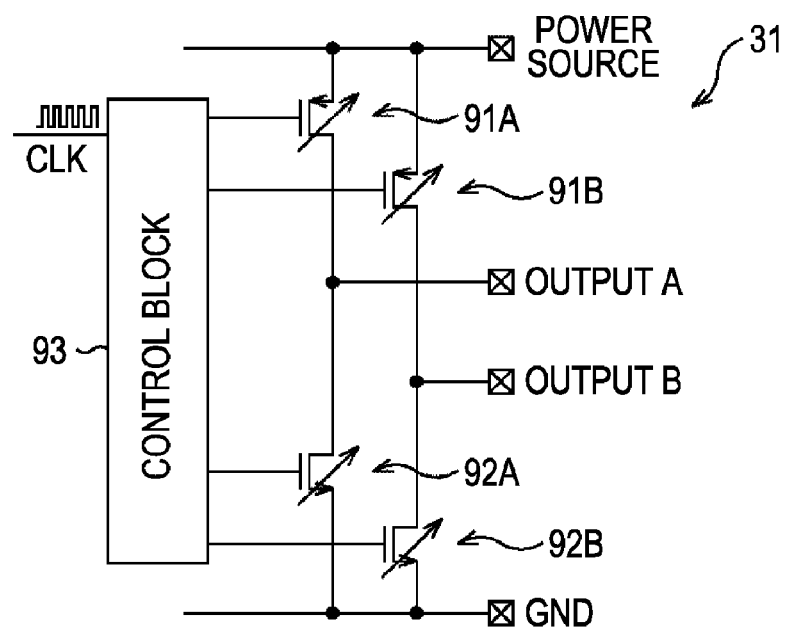
FIG. 13 shows another exemplary configuration of the actuator driver shown in FIG. 6.

FIG. 13 shows an exemplary configuration of the actuator driver 31 of the second embodiment.

Figure 12:
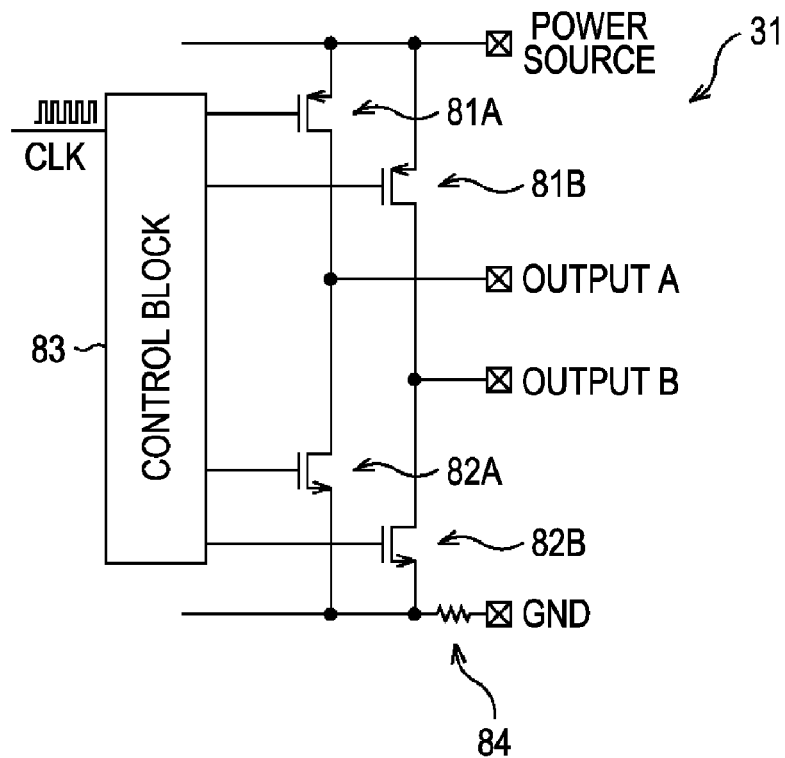
FIG. 12 shows an exemplary configuration of an actuator driver used in related art.

A method used in related art will be described, so as to make a comparison between the above-described method and the method used in the second embodiment. Namely, according to the method used in related art, current limitation is attained by providing a resistance in the signal-line path of the driver 31 shown in FIG. 10, as shown in FIG. 12, so that the peak of the instantaneous current is lowered and the noise is suppressed, which decreases the instantaneous current of the actuator driver 31 is reduced.

However, even though the above-described method used in related art allows for reducing the instantaneous current, the drive capacity of the driver 31 itself is also decreased. That is to say, there is a trade-off relationship between the drive capacity and the noise reduction.

Further, there has been a method of suppressing an instantaneous current (high-frequency component) by driving a load through an inductive element at the moment of the edge pulse, as disclosed in Japanese Unexamined Patent Application Publication No. 2003-153560. According to the above-described method, however, the inductive element is provided in a semiconductor or externally provided, which is not effective at attaining the downsized apparatus.

Therefore, the actuator driver 31 of the second embodiment has the exemplary configuration shown in FIG. 13, so as to solve the problems of the above-described methods used in related art.

That is to say, the actuator driver 31 shown in FIG. 13 includes switching elements 91A and 92A that are configured to dynamically vary an on-resistance, switching elements 91B and 92B that are configured to dynamically vary the on-resistance, and a control block 93. Thus, the actuator driver 31 of the second embodiment can dynamically vary the on-resistance of the driver switch itself. Therefore, it becomes possible to reduce the instantaneous current while maintaining the driver capacity without preparing a resistor element and/or an inductive element separately.

Figure 14:
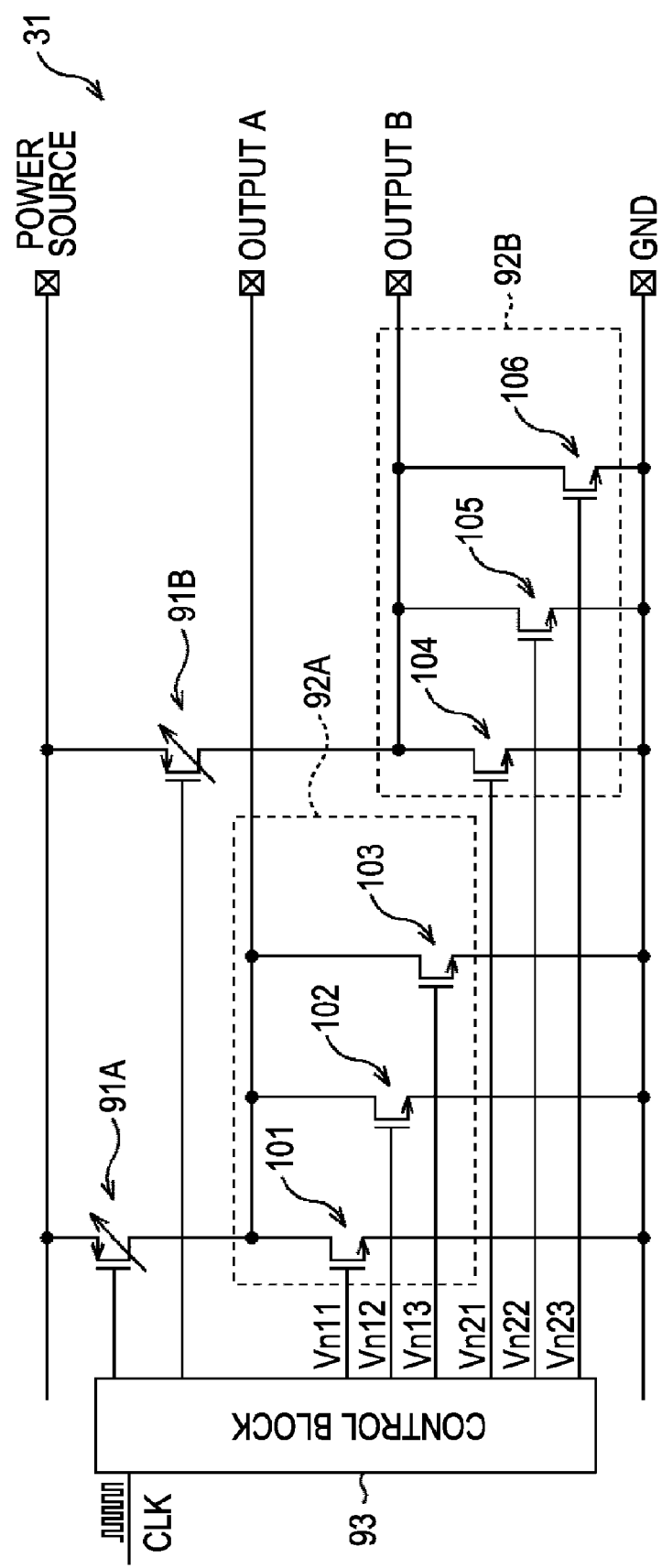
FIG. 14 shows another exemplary configuration of the actuator driver shown in FIG. 6.

FIG. 14 shows an exemplary specific configuration of the actuator driver 31 of the second embodiment, that is, the actuator driver 31 shown in FIG. 13.

In FIG. 14, the switching element 92A can be divided into three switching elements 101, 102, and 103 that are connected to one another, so as to make the on-resistance of a switch provided on the ground (GND) side variable. Similarly, the switching element 92B can be divided into three switching elements 104, 105, and 106 that are connected to one another. Here, the same circuit configuration as the above-described circuit configuration is provided on the power-source side, so as to control a dynamic on-resistance in the above-described manner.

Figure 15:
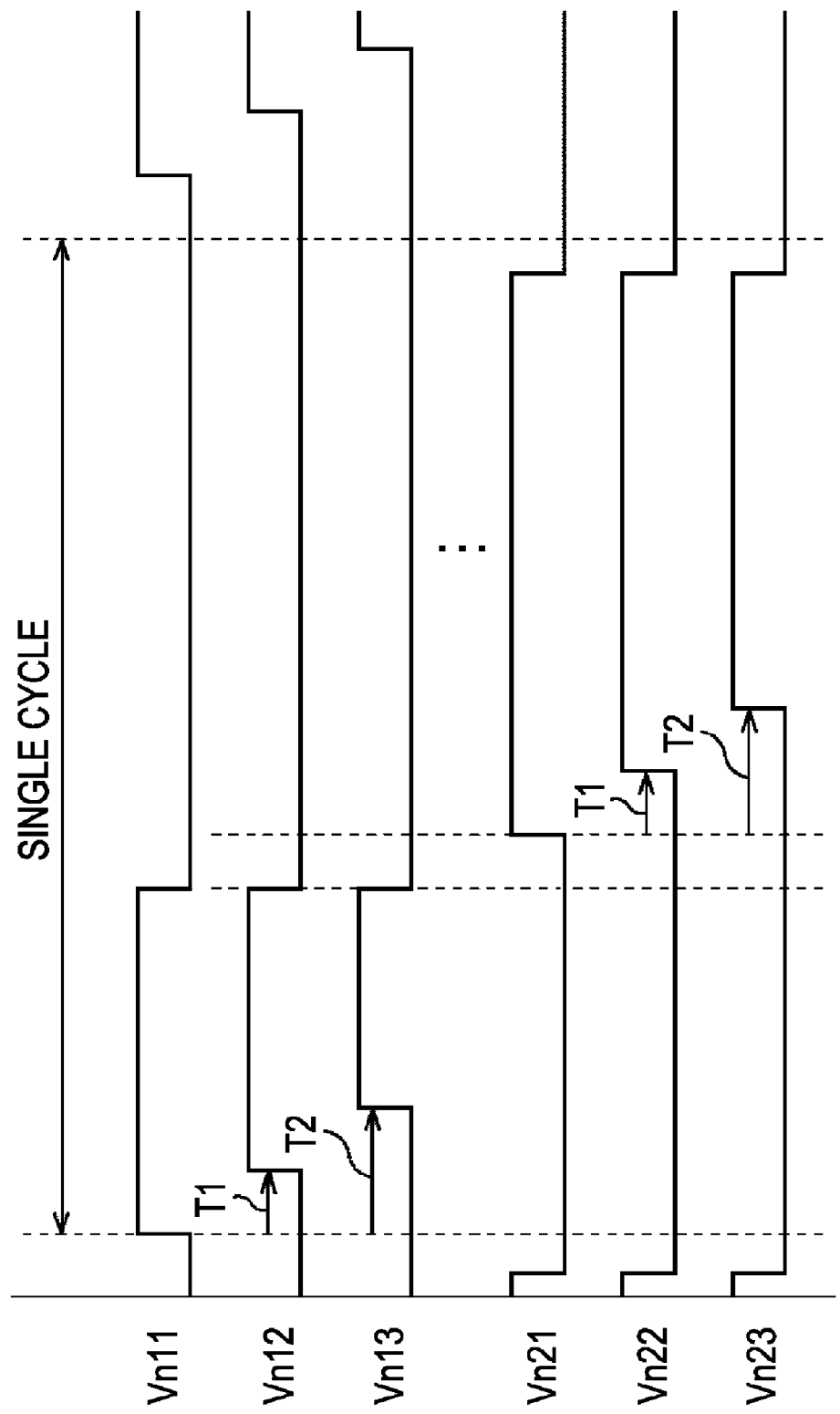
FIG. 15 shows timing charts showing exemplary operations performed by the actuator driver shown in FIG. 14.

FIG. 15 shows timing charts indicating exemplary operations of the actuator driver 31 shown in FIG. 14. Namely, the dynamic control of the drive capacity is performed as shown in FIG. 15.

As shown in FIG. 15, pulse signals Vn11, Vn12, and Vn13 are transmitted to the three individual switching elements 101 to 103 that are included in the switching element (switching transistor) 91B, whereby the individual switching elements 101 to 103 are dynamically turned on in sequence. Similarly, pulse signals Vn21, Vn22, and Vn23 are transmitted to the three individual switching elements 104 to 106 that are included in the switching element (switching transistor) 92B, whereby the individual switching elements 104 to 106 are dynamically turned on in sequence.

Accordingly, it becomes possible to change each of the resistance values, and decreasing the on-resistance in stages while suppressing the instantaneous current at the moment of the pulse edge. As a result, it becomes possible to increase the drive capacity and maintain the total drive capacity. Originally, each of the switching elements (switch transistors) 91B and 92B has a size sufficient enough to fill an appropriate on-resistance. Since each of the switching elements 91B and 92B is divided into the switching elements and the switching elements are dynamically turned on in sequence, the circuit size is not increased. Thus, it becomes possible to cut off the noise source and reduce the image-signal deterioration by suppressing the noise occurrence in the above-described manner.

Third Embodiment

According to a third embodiment of the present invention, the edge control is performed through the timing control described in the first embodiment so that the place where the noise occurs is shifted from the place corresponding to the time when the noise of the read circuit 42 occurs. Accordingly, the image-signal deterioration is prevented. Further, according to the third embodiment, the actuator driver 31 has the configuration described in the second embodiment so that the noise can further be reduced.

Fourth Embodiment

Figure 16:
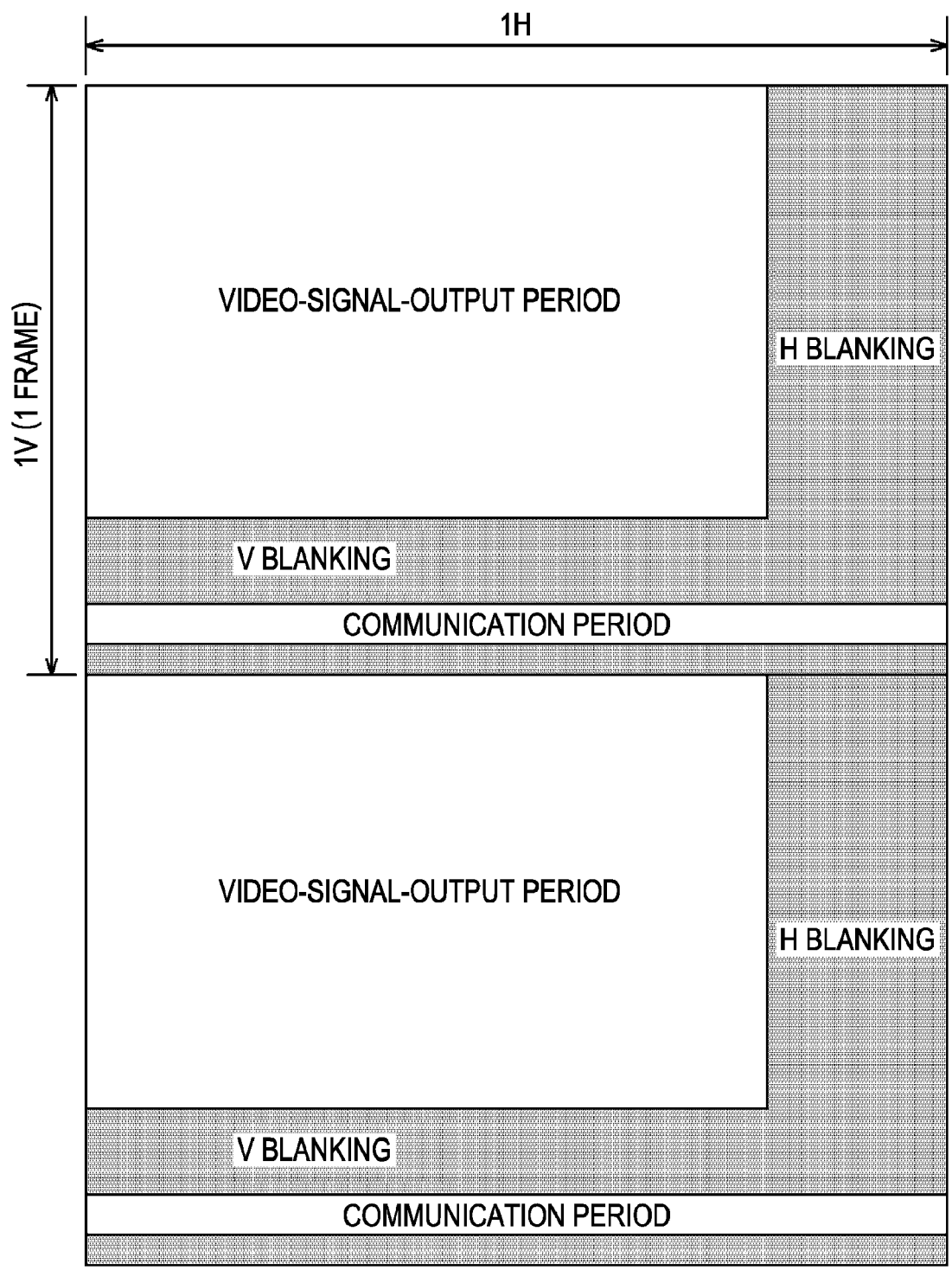
FIG. 16 shows exemplary timing of a control signal transmitted from a control IC shown in FIG. 1 and/or a control IC shown in FIG. 2.

FIG. 16 shows exemplary timing of a control signal transmitted from the control IC 24 shown in FIG. 2 described above.

Usually, communications are performed between the control IC 24 and the solid-state image pickup element 21 within a vertical (V) blanking period, so as to prevent a noise from sneaking into an image signal. That is to say, the communications are performed once every single frame. Therefore, the focus of the lens 22 is controlled in frames.

According to a fourth embodiment of the present invention, the actuator driver 31 used to perform the focus control is provided in the solid-state image pickup device 21 and the configuration of the first embodiment and/or the configuration of the second embodiment is used, so as to attain low noises and high-speed focus control.

Figure 17:
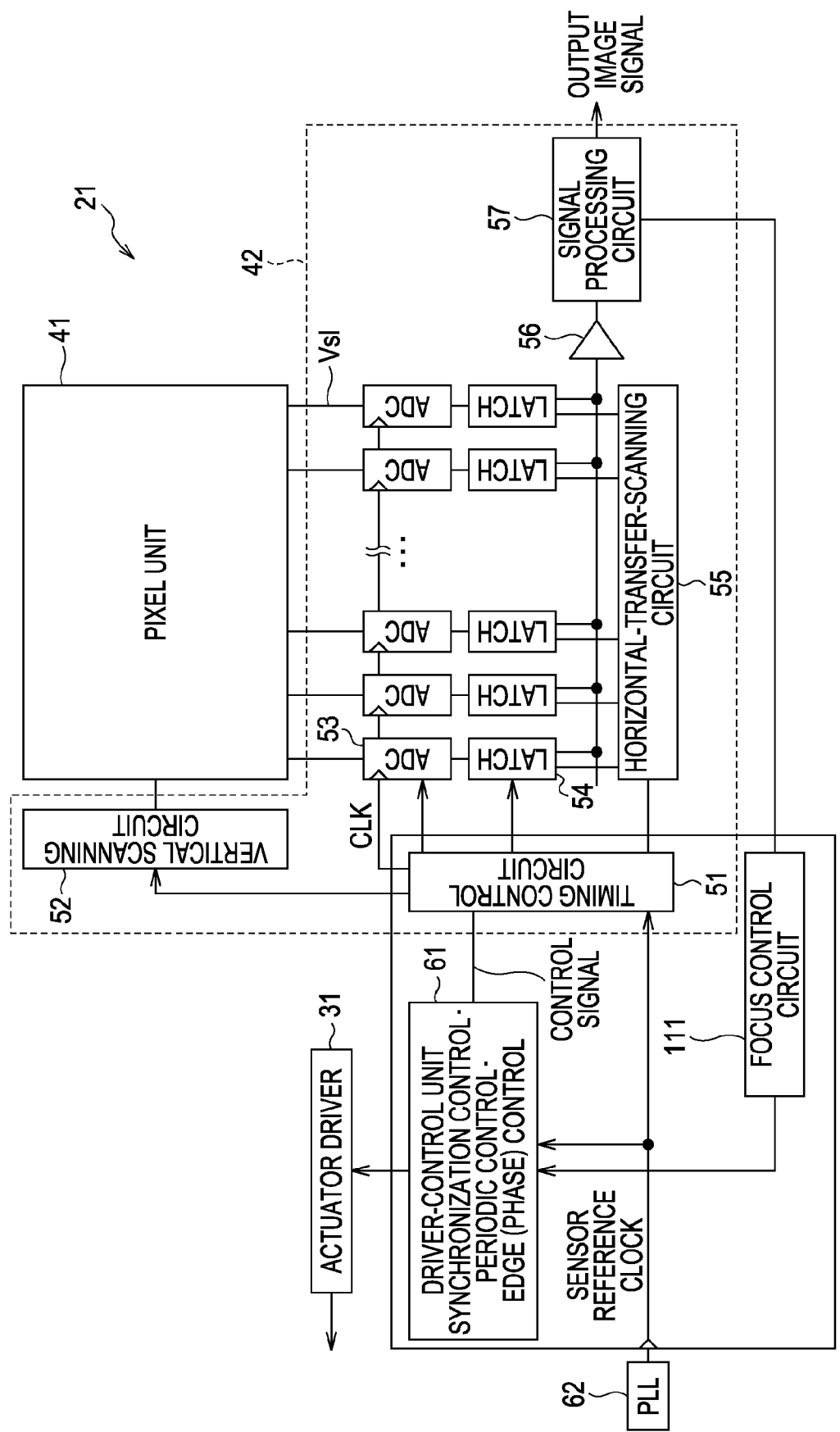
FIG. 17 specifically shows an exemplary configuration of the solid-state image pickup device shown in FIG. 2.

FIG. 17 shows an exemplary specific configuration of the solid-state image pickup device 21 of the fourth embodiment, that is, an exemplary specific configuration of a solid-state image pickup device according to an embodiment of the present invention, which is different from the configuration shown in FIG. 6 or the like. In FIG. 17, the components corresponding to those shown in FIG. 6 are designated by the corresponding reference numerals and the descriptions thereof are omitted as appropriate.

The solid-state image pickup device 21 shown in FIG. 17 includes the pixel unit 41 and the read circuit 42 thereof, the actuator driver 31, the driver-control unit 61 (including the PLL 62) configured to control the actuator driver 31, and a focus-control circuit 111. In FIG. 6, the read circuit 42 includes the timing-control circuit 51, the vertical-scanning circuit 52, the ADCs 53, the latches 54, the horizontal-transfer-scanning circuit 55, the amplifier 56, and the signal-processing circuit 57.

That is to say, the solid-state image pickup device 21 shown in FIG. 17 generates a driver pulse based on an image signal transmitted to the signal-processing circuit 57 by performing the focus control through the focus-control circuit 111. Since the focus control is performed inside the solid-state image pickup device 21 at that time, external communications may not be performed and high-speed focus control performed for every single frame or less can be attained in place of the focus control performed in frames.

FIG. 17 only shows an exemplary configuration of the solid-state image pickup device 21 of the fourth embodiment. Namely, the solid-state image pickup device 21 of the fourth embodiment may be configured so that the focus control is incorporated into an image sensor in which camera signal processing (DSP) is mounted. The above-described configuration also attains the same advantages as those attained by the configuration shown in FIG. 17.

Figure 18:
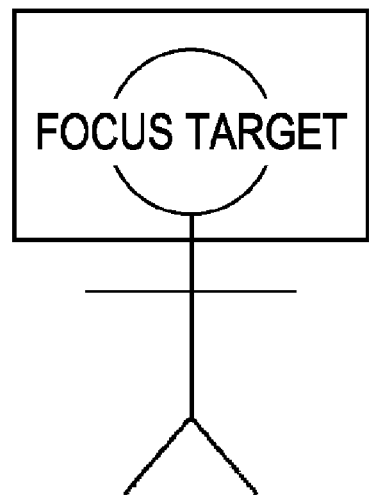
FIG. 18 illustrates exemplary focus control attained through the configuration shown in FIG. 17.
Figure 19:
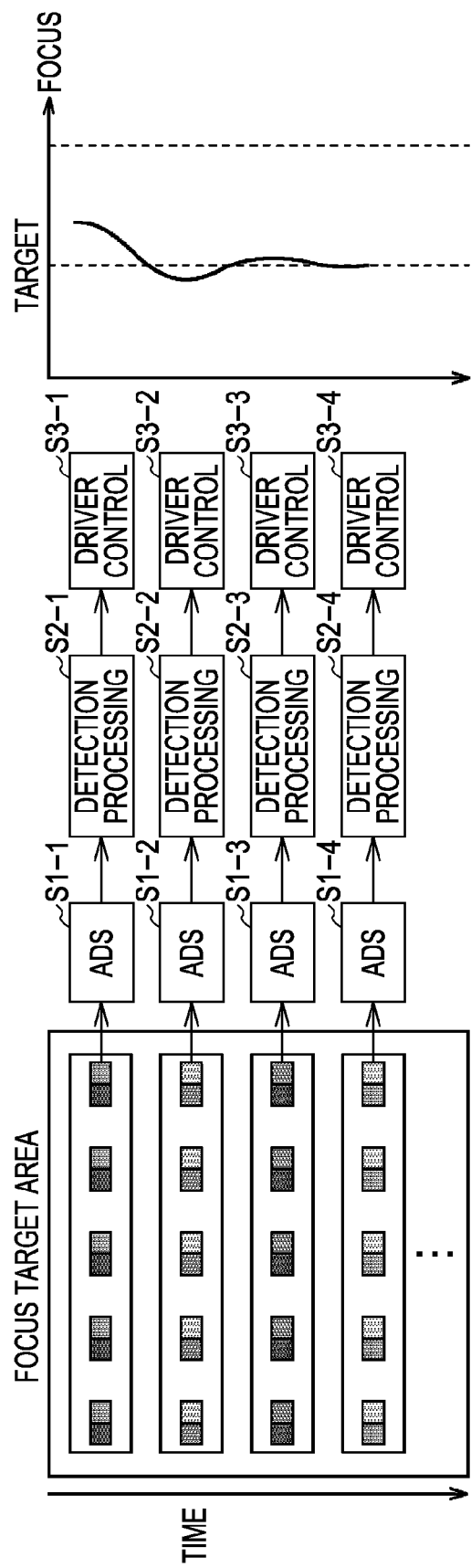
FIG. 19 also illustrates the exemplary focus control attained through the configuration shown in FIG. 17.

Each of FIGS. 18 and 19 is a schematic diagram illustrating the focus control. The solid-state image pickup device 21 determines a target area for focusing in the screen image, as exemplarily indicated by the sign "focus target" shown in FIG. 18. The method of determining the target area through the signal-processing circuit 57 of the solid-state image pickup device 21 and/or the method of performing communications, so as to acquire data of the target area alone from the control IC 24, may be adopted. As shown in FIG. 19, the solid-state image pickup device 21 performs the subsequent steps S1-K, S2-K, and S3-K (K denotes the line number) for each line. Namely, at step S1-K, the solid-state image pickup device 21 performs the A/D conversion for the image signals corresponding to a single line of the image signals of the target area. At step S2-K, the solid-state image pickup device 21 performs detection processing to detect edges and/or detect focus shifts one after another. At step S3-K, the solid-state image pickup device 21 feeds back data on the result of the detection processing performed at step S2-K, and controls the driver 31.

Thus, the solid-state image pickup device 21 of the fourth embodiment performs feedback control by a single frame or less. According to the exemplary configuration shown in FIG. 19, the control is performed for each line. However, it becomes possible to perform the detection for several lines at a time without being limited to the exemplary configuration shown in FIG. 19.

Thus, the solid-state image pickup device 21 of the fourth embodiment does not have to perform external communications. Therefore, a feedback loop is formed in the solid-state image pickup device 21 so that high-speed focus control can be attained while preventing noises from being caused by communications.

Fifth Embodiment

Figure 20:
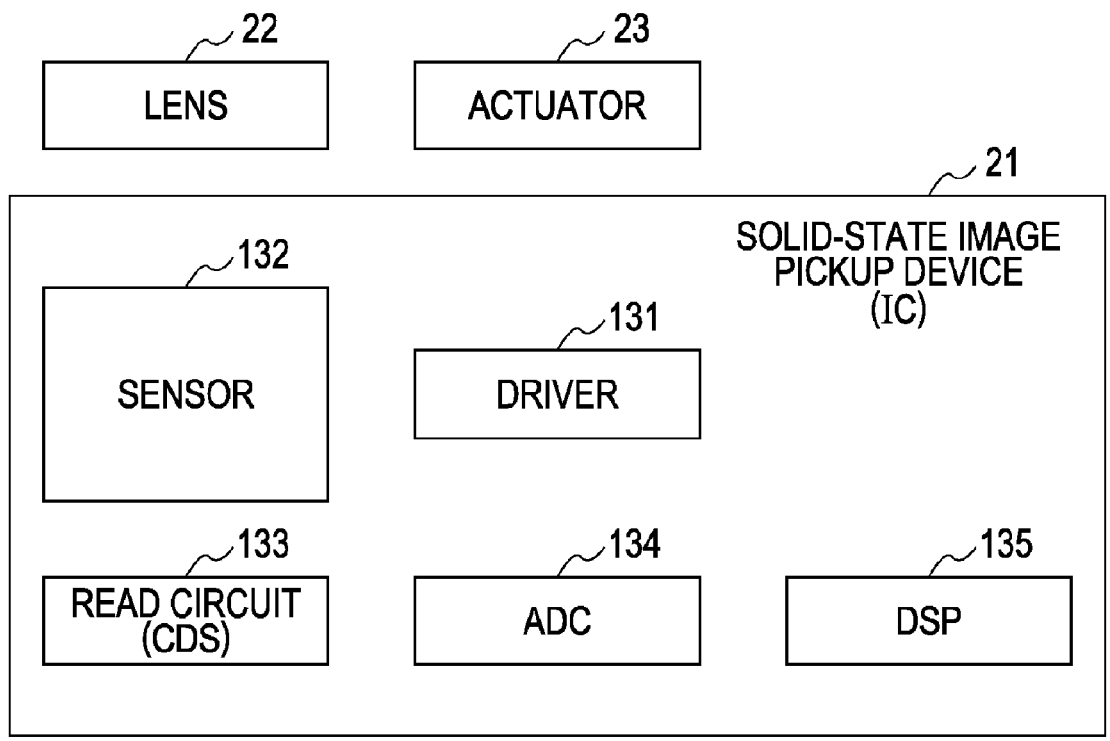
FIG. 20 shows an exemplary configuration of an apparatus according to another embodiment of the present invention, which is different from the exemplary configuration shown in FIG. 2.

FIG. 20 shows an exemplary configuration of an apparatus according to a fifth embodiment of the present invention, which is different from the exemplary configuration shown in FIG. 2.

The apparatus shown in FIG. 20 includes the solid-state image pickup device 21 configured as an IC, the lens 22, and the actuator 23.

In addition to a driver 131 of the actuator 23, a sensor 132 of the pixel unit, a read circuit (CDS) 133, an ADC 134, and a DSP 135 are integrated into the solid-state image pickup device 21.

When the apparatus shown in FIG. 20 is regarded as a camera module, the apparatus only includes the solid-state image pickup device 21, the lens 22, and the actuator 23, as its components. Therefore, it becomes possible to make the area of the driver component used for the actuator 23 smaller than that of the camera used in related art, the camera being shown in FIG. 1, so that the apparatus is downsized.

Further, when the apparatus shown in FIG. 20 is used for the segment in which the size reduction and provisions for an EMI emitted from a signal line and/or a component should be provided, such as the mobile-phone camera module, integrating the driver 131 into the solid-state image pickup device 21 means that the length of signal wiring extending from the driver 131 provided inside the solid-state image pickup device 21 provided near the lens 22 to the actuator 23 can be reduced. That is to say, the integration of the driver 31 means that an EMI emitted from pulse-driven signal wiring can be decreased.

However, when the driver 131 used for the actuator 23 is integrated into the solid-state image pickup device 21, where the driver 131 may become the noise source for the solid-state image pickup device 21, a noise may sneak into an image signal. Therefore, the above-described methods that can solve the above-described problem may be used for the apparatus shown in FIG. 20.

Thus, adopting a solid-state image pickup device according to an embodiment of the present invention allows for obtaining various advantages such as attaining a downsized camera module, reducing the image deterioration caused by noises, increasing the control capability, attaining the high-speed focus control, and so forth.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image pickup device comprising:
    driver-control means for controlling operation timing of a pulse-driven actuator driver based on read timing of a sensor of a solid-state image pickup element,
    wherein,
    the driver-control means synchronizes the operation timing with the read timing, and sets a cycle of a pulse signal of the actuator driver to an integral multiple and/or an integral submultiple of a read cycle of the sensor, and
    the driver-control means synchronizes the operation timing with the read timing, and sets a cycle of a pulse signal of the actuator driver to an integral multiple and/or an integral submultiple of a read cycle of the sensor.

2. The solid-state image pickup device according to claim 1, wherein the driver-control means changes the phase of the pulse signal of the actuator driver so that sampling timing of a read circuit of the sensor does not overlap an edge of the pulse signal.

3. The solid-state image pickup device according to claim 1, wherein the driver-control means performs control so that a pulse signal of the actuator driver does not occur when sampling timing of a read circuit of the sensor overlaps an edge of the pulse signal.

4. The solid-state image pickup device according to claim 1, wherein the driver-control unit performs control so that a pulse signal of the actuator driver does not occur when sampling timing of a read circuit of the sensor overlaps an edge of the pulse signal.

5. A solid-state image pickup device comprising driver-control means for controlling operation timing of a pulse-driven actuator driver based on read timing of a sensor of a solid-state image pickup element, wherein the actuator driver is provided inside the solid-state image pickup device.

6. The solid-state image pickup device according to claim 5, wherein the actuator driver dynamically changes a drive capacity.

7. A solid-state image pickup device comprising driver-control means for controlling operation timing of a pulse-driven actuator driver based on read timing of a sensor of a solid-state image pickup element, wherein the driver-control means performs feedback control inside the solid-state image pickup device, so as to generate a pulse signal of the actuator driver by using a signal read from the sensor.

8. A solid-state image pickup device comprising:
    a driver-control unit configured to control operation timing of a pulse-driven actuator driver based on read timing of a sensor of a solid-state image pickup element,
    wherein,
    the driver-control unit synchronizes the operation timing with the read timing, and sets a cycle of a pulse signal of the actuator driver to an integral multiple and/or an integral submultiple of a read cycle of the sensor, and
    the driver-control unit synchronizes the operation timing with the read timing, and sets a cycle of a pulse signal of the actuator driver to an integral multiple and/or an integral submultiple of a read cycle of the sensor.

9. The solid-state image pickup device according to claim 8, wherein the driver-control unit changes the phase of the pulse signal of the actuator driver so that sampling timing of a read circuit of the sensor does not overlap an edge of the pulse signal.

10. A solid-state image pickup device comprising a driver-control unit that controls operation timing of a pulse-driven actuator driver based on read timing of a sensor of a solid-state image pickup element, wherein the actuator driver is provided inside the solid-state image pickup device.

11. The solid-state image pickup device according to claim 10, wherein the actuator driver dynamically changes a drive capacity.

12. A solid-state image pickup device comprising a driver-control unit that controls operation timing of a pulse-driven actuator driver based on read timing of a sensor of a solid-state image pickup element, wherein the driver-control means performs feedback control inside the solid-state image pickup device, so as to generate a pulse signal of the actuator driver by using a signal read from the sensor.

* * * * *